Figure 4:
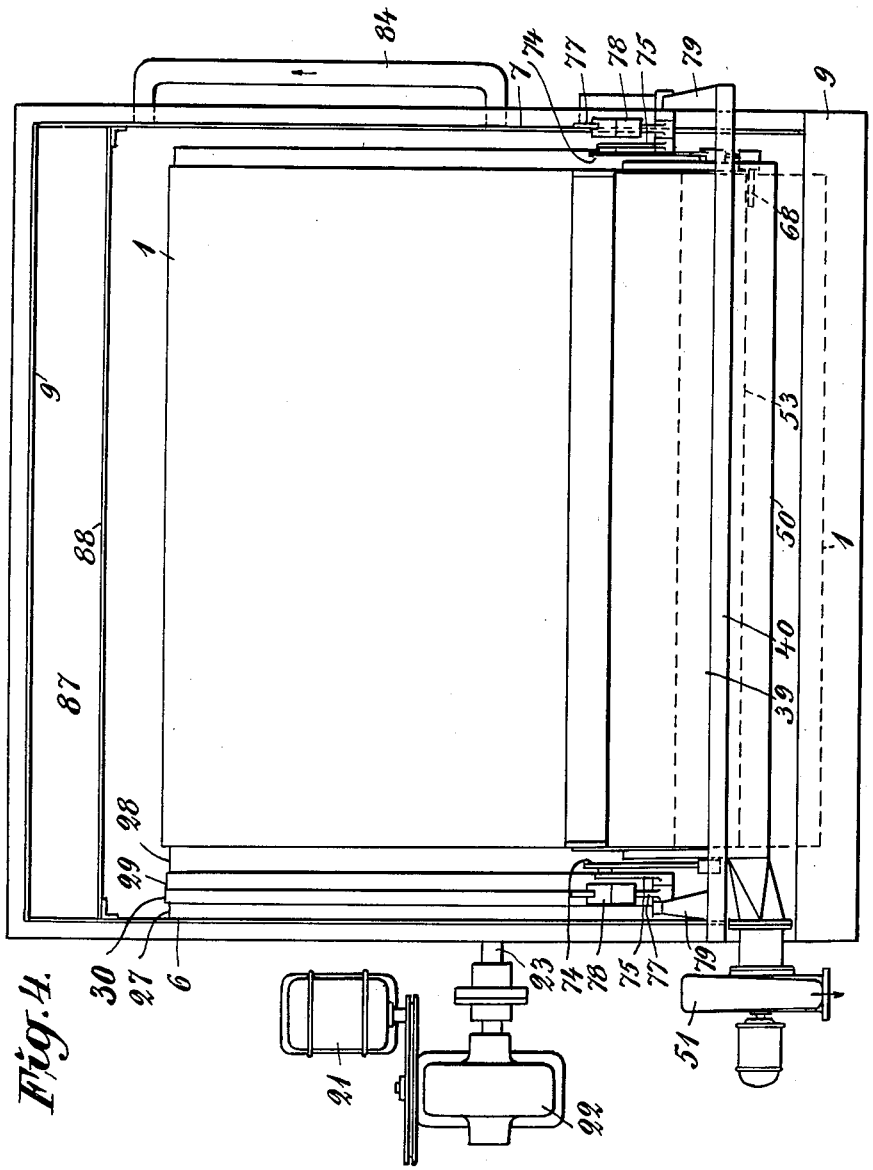

June 19, 1956 O. B. BÖRJESON 2,751,086
APPARATUS FOR THE SEPARATION OF PARTICLES, PARTICULARLY
FIBRES, THAT ARE SUSPENDED IN A LIQUID
Filed July 16, 1952 4 Sheets-Sheet 1
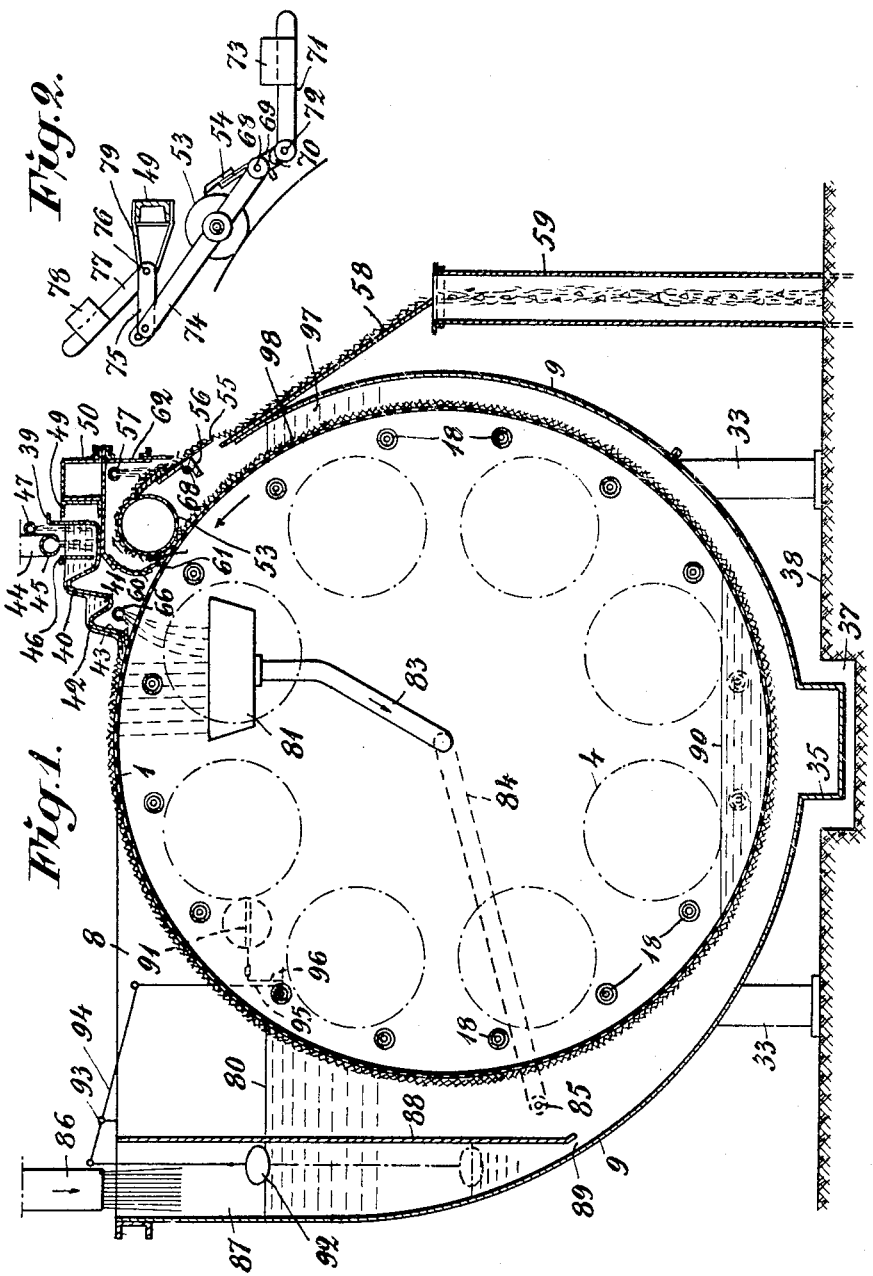
INVENTOR
OLOV BIRGER BÖRJESON
BY Robert E Burns
ATTORNEY

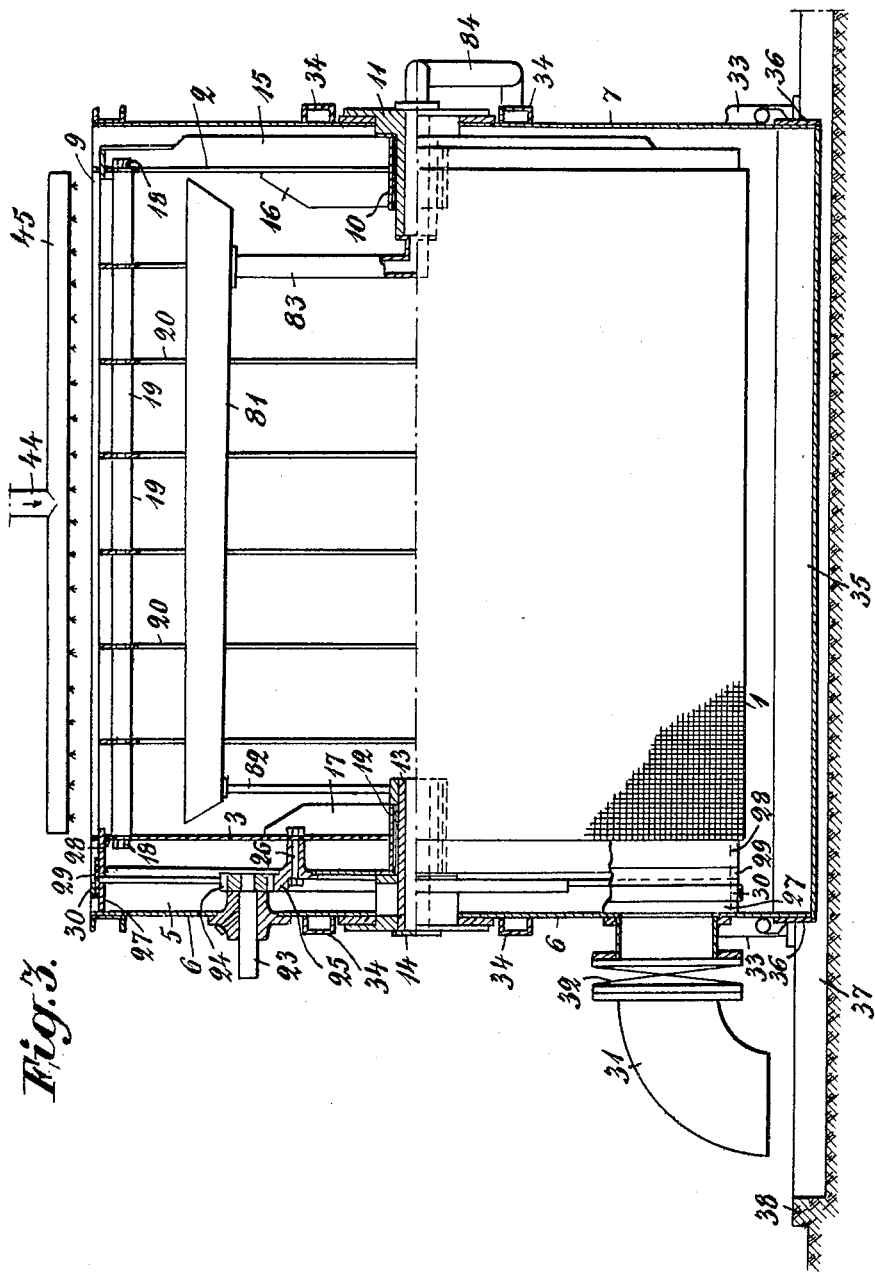

June 19, 1956 O. B. BÖRJESON 2,751,086
APPARATUS FOR THE SEPARATION OF PARTICLES, PARTICULARLY
FIBRES, THAT ARE SUSPENDED IN A LIQUID
Filed July 16, 1952 4 Sheets-Sheet 3

INVENTOR
OLOV BIRGER BÖRJESON
BY
ATTORNEY

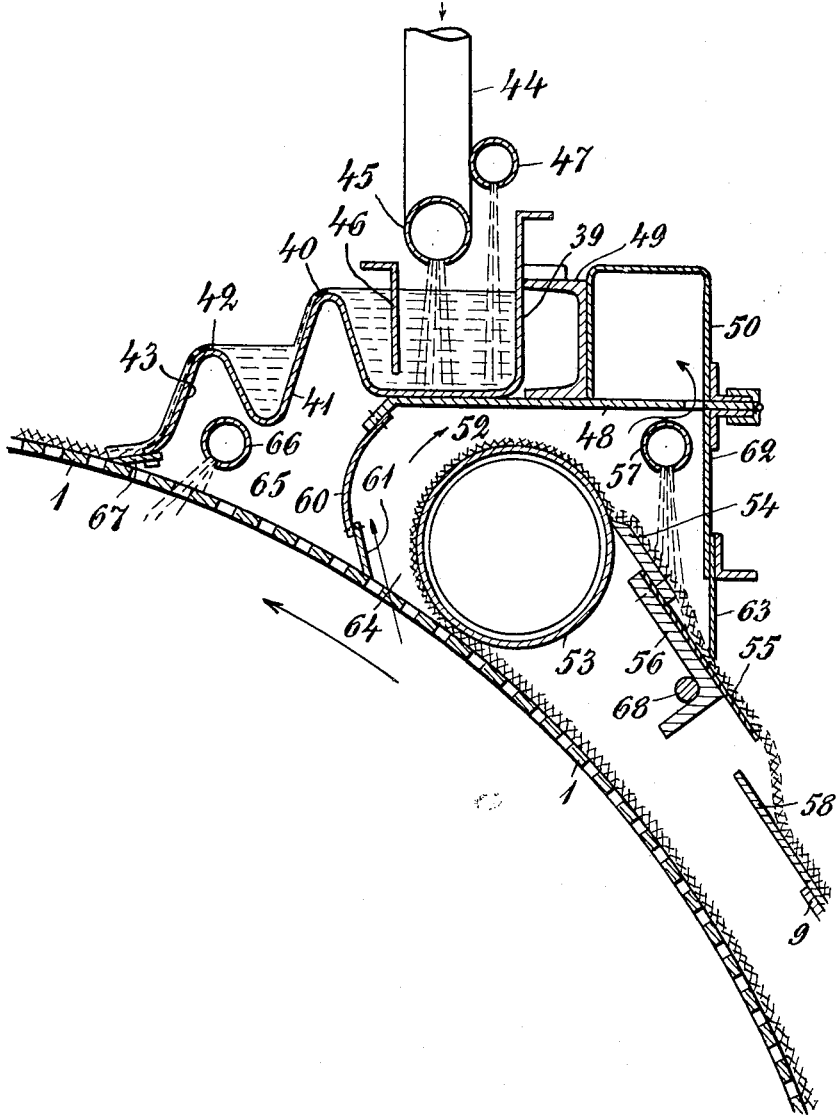

United States Patent Office 2,751,086
Patented June 19, 1956

2,751,086

APPARATUS FOR THE SEPARATION OF PARTICLES, PARTICULARLY FIBRES, THAT ARE SUSPENDED IN A LIQUID

Olov Birger Börjeson, Bromma, Sweden, assignor to Seje & Thurne Aktiebolag, Stockholm, Sweden, a corporation of Sweden Application July 16, 1952, Serial No. 299,199

Claims priority, application Sweden April 3, 1952

2 Claims. (Cl. 210—199)

The present invention refers to such apparatus for the separation of particles suspended in a liquid that are of the type particularly made use of in cellulose factories for the purification of the so-called back water and for the recovery of fibres suspended therein. The invention relates especially to apparatus of the kind consisting of a liquid container and a strainer drum arranged therein and partly submerged in the liquid, said drum being adapted to rotate, while the liquid flows through the cylindrical shell of the drum, which is perforated or consists of wire gauze, the fibres being thus caused to deposit on the outside of the drum and to be separated from the drum at a point located above the surface of the liquid. The liquid which is to be purified in this manner generally contains both long and short fibres in varying proportions. In consideration of this fact it was hitherto necessary to select the width of the meshes of the shell of the strainer drum comparatively small, or to resort to relatively complicated means for repeated straining of the liquid for the purpose of achieving an effective separation of the short-fibred material as well. The employment of a strainer gauze with too fine meshes involves the drawback that the working capacity of the apparatus, that is to say the quantity of liquid flowing through the strainer per unit of time and unit of surface is reduced. The object of the present invention is to increase the fibre-separating capacity of the strainer drum without appreciably reducing its capacity to let the purified liquid therethrough. To this end the apparatus according to the invention is provided with a means for applying an auxiliary suspension onto the portion of the shell of the strainer drum located above the surface of the liquid in the container, in a manner such that the particles separated from this suspension form a filter-like layer on the outer surface of the strainer drum. By the fact that this fibre layer is applied to the portion of the drum situated above the liquid surface, while the drum performs its rotating movement, the fibre layer will remain on the drum also during the passage through the liquid in the container, so that the whole of the portion located underneath the liquid surface will be covered by said fibre layer, which will thus act as a filter which absorbs and separates the short fibres as well as the long ones. Hereby the straining capacity of the drum is increased, without the capacity of the drum to permit the passage of water therethrough being reduced in any appreciable degree. As an auxiliary suspension a fibre suspension is preferably made use of, which is more concentrated than the suspension flowing through the liquid container. The means by which said auxiliary suspension is applied is preferably made controllable, so that the degree of concentration of the auxiliary suspension may be varied with respect to the nature or composition of the fibrous material in the liquid to be purified.

The invention will be described more closely with reference to the accompanying drawings, which illustrate a form of embodiment of an apparatus constructed in accordance with the invention for the separation of fibres from the back water in cellulose factories. Fig. 1 shows a cross section through the apparatus and the strainer drum. Fig. 2 shows details to a larger scale. Fig. 3 shows a partly sectioned elevation of the apparatus, the strainer being conceived of as being removed from the upper half of the strainer drum. Fig. 4 is a plan view of the apparatus. Fig. 5 is a view to a larger scale of the means for applying the auxiliary suspension onto the strainer drum and for the separation of the layer of fibres from the drum.

The strainer drum comprises a cylindrical shell 1, which in the example shown is taken to be perforated but which may consist of one or more layers of wire gauze, an end wall 2, which at the right-hand end in Fig. 3 closes the space enclosed by the shell of the drum, and an end wall 3 provided with a number of circular apertures, which in Fig. 1 are indicated by chain-dotted circles 4 and through which the interior of the drum communicates with a cylindrical space 5 located outside said end wall 3. The strainer drum is rotatably mounted in the end walls 6, 7 of a liquid container 8 enclosing the strainer drum, the jacket wall 9 of the container having the cross sectional shape shown in Fig. 1 and fitting to the drum. The end wall 2 of the drum is mounted by means of a bearing sleeve 10 on a hollow bearing pin 11 secured in the wall 7, and the end wall 3 is mounted in a similar manner by means of a bearing sleeve 12 on a hollow bearing pin 13 secured in the wall 6, this bearing pin 13 being closed at the outer end thereof by means of a removable cover 14. The end walls 2, 3 are reinforced by means of radial ribs or spokes 15, 16, 17 and are internally braced relatively to each other by means of longitudinally extending rods 18 arranged inside the shell of the drum and by tubular pieces 19 thrust onto said rods, these tubular pieces forming distance members between a number of sheet-metal rings 20 forming a substructure and support for the shell 1 of the drum.

The strainer drum is adapted to be operated by an electric motor 21, Fig. 4, said motor driving a shaft 23 through the intermediary of a worm gearing 22 and said shaft 23 being mounted in the wall 6 and adapted in turn to drive the drum by means of a pinion 24 and a gear wheel 25 secured to the end wall 3 of the drum by means of bolts 26. The gearing 24, 25 is arranged within the abovementioned cylindrical space 5, the cylindrical jacket wall of which is constituted in part by a cylindrical flange 27 secured to the wall 6 and in part by a cylindrical flange 28 secured to the end wall 3. The intermediate space between these flanges is sealed outwardly by means of a rubber ring 29 which is secured to the flange 27 by means of a metal ring 30. Connected to the wall 6 is an outlet pipe 31 communicating with the space 5, said outlet pipe having a valve 32 inserted therein.

The liquid container 8 is mounted on a number of posts 33, Fig. 1, which are connected to the end walls 6, 7 of the container by means of horizontal girders 34 secured to these end walls. The lower portion of the shell 9 of the liquid container is formed into a channel 35 to collect sludge and non-separated fibres, which may be emptied through doors 36 into a drain channel 37 in the floor 38.

The means for applying the auxiliary suspension is shown most clearly in Fig. 5. It consists of a filling receptacle 39 in the form of a chute, which preferably extends all over the length of the strainer drum and which is provided with an overflow 40, over which the suspension flows to an equalizing chute 41, which likewise extends all over the length of the strainer drum, and which is in turn provided with an overflow 42 continuing in a sloping wall 43, along which the suspension flows down onto the shell 1 of the drum. The auxiliary suspension is supplied through a pipe 44 and a horizontal distributing pipe 45 connected thereto, from which the suspension flows directly down into the receptacle 39. To prevent movements in the liquid beside the overflow 40, a vertical baffle plate 46 is fitted between the overflow and the point of inflow of the suspension, which latter must then pass underneath the lower edge of the baffle plate 46 to reach the overflow 40. When required, the suspension may be diluted with water through a pipe 47 to control the degree of concentration. The receptable 39 is arranged on a horizontal shelf 48, which is secured to a longitudinally extending girder 49 mounted so as to permit of being raised and lowered in the frame of the apparatus. The shelf also carries the suction box 50 connected to an evacuating pump 51, Fig. 4, said box communicating through a hole in the shelf with a space 52 having the means for the separation of the fibre layer from the drum arranged therein. The latter means consists of a hollow roller 53 extending in the longitudinal direction all over the length of the strainer drum and adapted to rotate in contact with the shell of the drum, the fibre layer being thus compressed and transferred onto the roller by adhesion and entrained by the roller, until it reaches the edge of a scraper 54 bearing on the surface of the roller. The fibrous pulp separated from the roller passes in the transverse direction over the scraper and over an inclined plate 55, which is secured to a bar 56 carrying the scraper. Then the pulp passes over the scraper, water is being supplied from a pipe 57 to facilitate the downward movement of the fibrous pulp. The fibrous pulp falls from the lower edge of the plate 55 down onto the outside of a sloping plate 58, along which the pulp is moved further to a collecting pocket 59, from which the pulp escapes through an outlet. On one side of the roller 53, the space 52 is closed by a curved wall 60, which is sealed by means of a rubber lip 61 against the surface of the strainer drum shell. On the other side, the space 52 is limited by the scraper 54 and the plate 55 as well as by a vertical wall 62 extending from the shelf 48 and by an elastic flange 63 connected to said wall and bearing loosely with the outer edge thereof on the plate 55 or terminating at some distance from the latter. Through this limitation of the space about the roller 53 a powerful suction of air through the space 52 is created, which is particularly the case in the restricted portion 64 of said space located adjacent to the shell of the strainer drum, whereby the separation of the fibre layer from the drum is facilitated. Fibres that might be entrained with the drum are scraped off the latter at the rubber lip 61 to follow the air round the roller 53 to the upper portion of the space 52. By reason of the vacuum created by the suction box air may also be sucked off the space 65, which is limited by the container 39, the chute 41, the wall 43, the strainer drum shell and the wall 60. The fibres that might be entrained with the drum past the lip 61 are washed off the surface of the drum by means of water jets from a pipe 66. To provide for a good tightening effect between the sloping wall 43 and the shell of the drum said wall is provided at the lower edge thereof with a rubber lip 67 bearing with the outer edge thereof on the drum.

The angle bar 56 carrying the scraper 54 is swingable about an axis 68 in order to facilitate a swinging movement of the scraper into and out of its working position and to facilitate setting of the scraper at a suitable pressure agains the surface of the roller 53. For this purpose the angle bar 56 is connected through links 69, 70 to a lever 71, as will appear from Fig. 2, said lever being swingable about an axis 72 and provided with a weight 73 which is adjustable along the arm, by means of which weight a turning moment may be transferred to the angle bar 56 to achieve a suitable bearing pressure between the scraper 54 and the roller 53.

To provide for a suitable bearing pressure between the roller 53 and the shell of the drum, the roller is mounted at the ends thereof in arms 74, which are swingable about the axis 68 and connected through an arm 75 and a pivot 76 to a lever 77, on which a weight 78 is adjustably arranged for the purpose of controlling the turning moment transferred to the arms 74. The shaft 76 is mounted in a member 79 of the frame, said member being rigidly connected with the girder 49.

When the strainer drum rotates in the direction indicated by the arrow in Fig. 1 and the auxiliary suspension is applied in an adapted quantity and in a suitable concentration a filter-like layer of fibres is formed on the portion of the drum shell located above the water surface 80 in the liquid container. The fibre layer is retained in part by the adhesion against the shell and in part through the external pressure created by the vacuum within the drum. The fibre layer will thus remain on the shell during its passage through the liquid in the container and then serves as a filter for the liquid flowing through the shell of the drum, the fibres suspended in the liquid being thus separated and caused to deposit on said filter layer, which thus increases successively in thickness. When the fibre layer reaches the takeoff roller 53, the same will be separated from the drum in the manner previously described. The liquid in the auxiliary suspension flows off through the shell of the strainer drum at the portion of the shell located above the surface of the liquid, a portion of the fibres being then caused to follow the water escaping adjacent to the point of application. The water escaping in this manner and the fibres entrained therewith are collected in an elongated collecting receptable 81 arranged within the strainer drum underneath the point of application, said collecting receptacle being carried by the fixed journals of the drum at one end of a rod 82 and at the other end by a pipe 83 opening into the central bore of the journal 11 and serving as an outlet for water and fibres collected in the receptacle 81. Connected to the outer end of the bore of the journal 11 is a pipe 84, which opens into an aperture 85 in the end wall 7 of the liquid container. The mixture of water and fibres escaping from the receptacle 81 is thus transferred to the liquid space in the liquid container to mix with the fibrous suspension therein.

The fibrous suspension to be subjected to straining is supplied to the liquid container through a pipe 86, Fig. 1, the suspension then flowing into a space 87, which is screened off by a baffle plate 88 from the remaining liquid space in the container, into which space the suspension flows through a narrow passage 89 between the shell wall 9 and the lower edge of the baffle plate. This prevents motions in the liquid caused by the inflowing suspension from being transferred to the portion of the liquid space surrounding the strainer drum.

On account of the resistance to flow of the filter layer there is a head between the liquid level 80 outside the drum and the liquid level 90 inside the drum, which latter corresponds to the level of the discharge pipe 31. The vacuum may be controlled to a certain extent by choking the valve 32. However, a special valve 91, Fig. 1, is preferably used for this purpose, said valve being arranged in the outer wall 6 of the space 5, Fig. 3. In the example shown, this valve is arranged to be automatically opened and closed in dependence on the liquid level 80. The control is effected by means of a float 92 arranged in the space 87, said float being connected to the valve 91 by means of a lever 94 pivotally mounted at 93 and a link connection 95, 96, indicated in part only, said valve taking the form of a throttle valve. The supply of suspension through the pipe 86 is so adapted that the liquid will normally keep at the level shown in Fig. 1. However, since the liquid level 80 is also dependent on the vacuum within the strainer drum, a certain control of the liquid level may be achieved by a float control of the valve 91 in the manner set forth. When the liquid level falls, the valve opening is increased while the resistance to flow of the valve 91 is reduced, the vacuum being thus reduced, which is also the case with the rate of flow of the liquid through the shell of the drum, so that the liquid level is again caused to rise. When the liquid level rises, a control will be effected in an analogous manner in the opposite direction. The discharge valve 32, Fig. 3, may be arranged to be controlled in a corresponding manner. In this way the control may proceed automatically at the maintenance of a suitable, relatively low vacuum, such as 150 mm., within the strainer drum, the liquid surface 90 being thus caused to keep at a corresponding level above the discharge valve 32.

Through the rotation of the strainer drum, the liquid layer adjacent to the shell of the drum is brought into movement round the circumference of the drum from the front portion of the liquid space to the remote portion thereof. Consequently, there will be an accumulation of fibres in the remote portion 97 of the liquid space, which may under unfavourable circumstances influence the filter layer 98 on the drum, so that said layer will be injured and is caused to work loose in part.

What I claim is:

1. An apparatus for separating fibers from a liquid fiber suspension, comprising a walled container for the liquid suspension, a rotary strainer drum comprising a cylindrical shell mounted for rotation in a predetermined direction in the container and dimensioned to provide a free liquid space between the cylindrical shell of the drum and the surrounding wall of the container, means for depositing an auxiliary fiber suspension on the upper, descending surface of said drum, whereby to form a continuous fibrous filter layer on the drum, said means comprising a supply receptacle for the auxiliary fiber suspension, an overflow chute receiving auxiliary suspension from said receptacle extending transversely over the entire length of the top portion of the strainer drum and having a sloping bottom tightly adjoining the shell of the drum, a take-up roller at the rising side of the strainer drum near said chute for discharging from the strainer drum the fibers deposited thereon, said roller positioned to adjoin tightly the fiber-covered drum, means defining an air passage between said chute and said take-up roller, and a suction box communicating with the interior of the strainer drum through said air passage.

2. An apparatus for separating fibers from a liquid fiber suspension, comprising a walled container for the liquid suspension, a rotary strainer drum comprising a cylindrical shell mounted for rotation in a predetermined direction in the container and dimensioned to provide a free liquid space between the cylindrical shell of the drum and the surrounding wall of the container, means for depositing an auxiliary fiber suspension on the upper, descending surface of said drum, whereby to form a continuous fibrous filter layer on the drum, said means comprising a supply receptacle for the auxiliary fiber suspension, a distributing chute for the auxiliary suspension discharged from said receptacle extending transversely over the entire length of the top portion of the strainer drum and adjoining the shell of the drum, a take-up roller at the rising side of the strainer drum near said chute for discharging from the strainer drum the fibers deposited thereon, said roller positioned to adjoin tightly the fiber-covered drum, and means defining an air passage between said chute and said take-up roller.

References Cited in the file of this patent
UNITED STATES PATENTS

| | | |
|---|---|---|
| Re. 21,201 | Qviller | Sept. 5, 1939 |
| 898,212 | Gaara et al. | Sept. 8, 1908 |
| 951,183 | Gaara | Mar. 8, 1910 |
| 1,360,684 | Roberts | Nov. 30, 1920 |
| 1,867,930 | Traquair | July 19, 1932 |
| 1,914,742 | Hillier | June 20, 1933 |
| 2,092,111 | Dons et al. | Sept. 7, 1937 |
| 2,100,149 | Qviller | Nov. 23, 1937 |
| 2,108,231 | Nash | Feb. 15, 1938 |
| 2,154,719 | Berry | Apr. 18, 1939 |
| 2,327,543 | Moor | Aug. 24, 1943 |
| 2,352,304 | Young | June 27, 1944 |
| 2,449,902 | Kiersted | Sept. 21, 1948 |
| 2,598,606 | Robison | May 27, 1952 |
| 2,609,732 | Breyfogle | Sept. 9, 1952 |

FOREIGN PATENTS

| | | |
|---|---|---|
| 311,934 | Germany | Nov. 11, 1917 |
| 47,646 | Norway | Mar. 10, 1930 |
| 76,779 | Sweden | Jan. 18, 1932 |
| 57,153 | Norway | Oct. 12, 1936 |
| 123,534 | Sweden | Dec. 7, 1948 |
| 463,622 | Canada | Mar. 14, 1950 |